Jan. 9, 1951 R. W. TEEMAN ET AL 2,537,379
GRAIN DRYING AND COOLING APPARATUS
Filed April 5, 1946 4 Sheets-Sheet 2
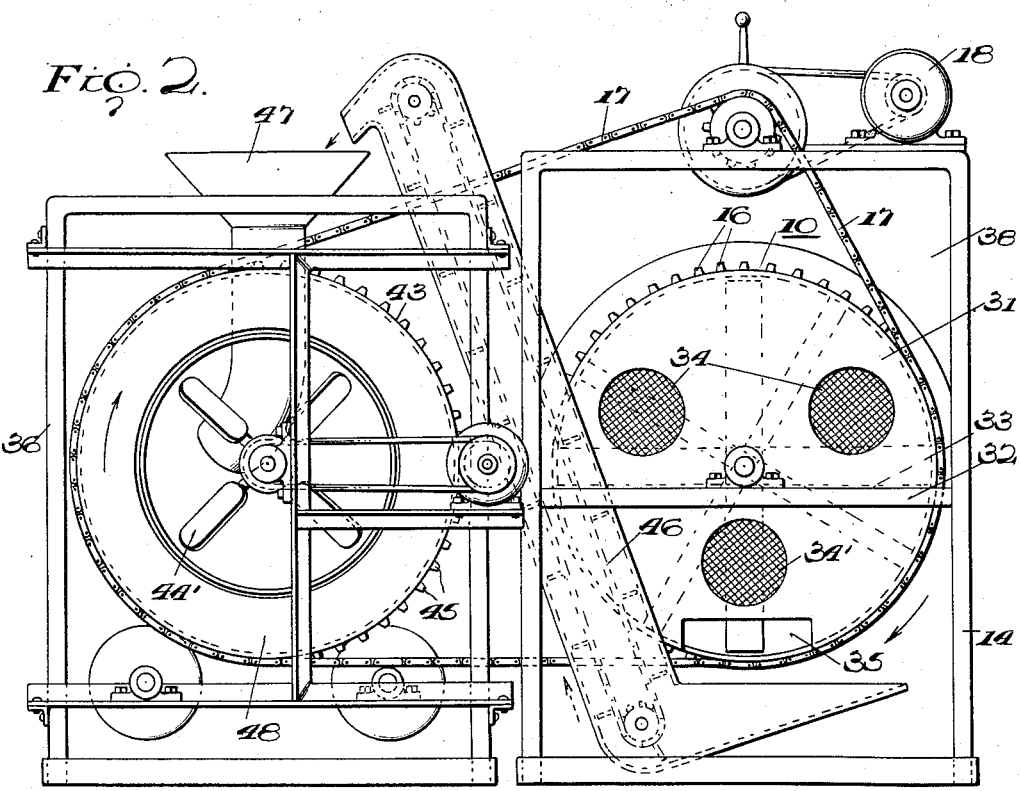
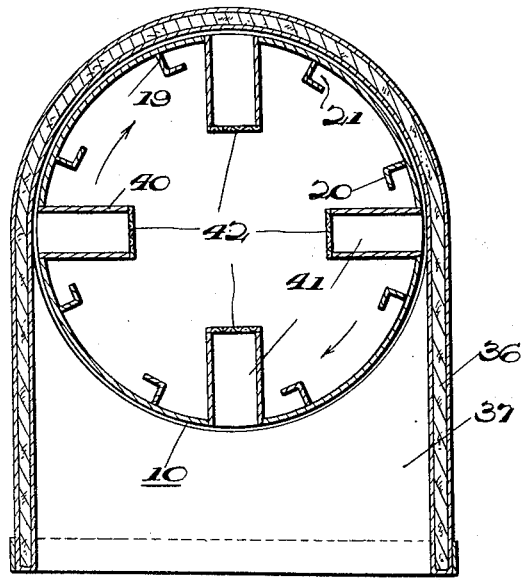
INVENTORS
Frithjof N. Kolberg.
Ruben W. Teeman.
BY Vernon A. Dorsey
ATTORNEY Jan. 9, 1951 R. W. TEEMAN ET AL 2,537,379
GRAIN DRYING AND COOLING APPARATUS
Filed April 5, 1946 4 Sheets-Sheet 3

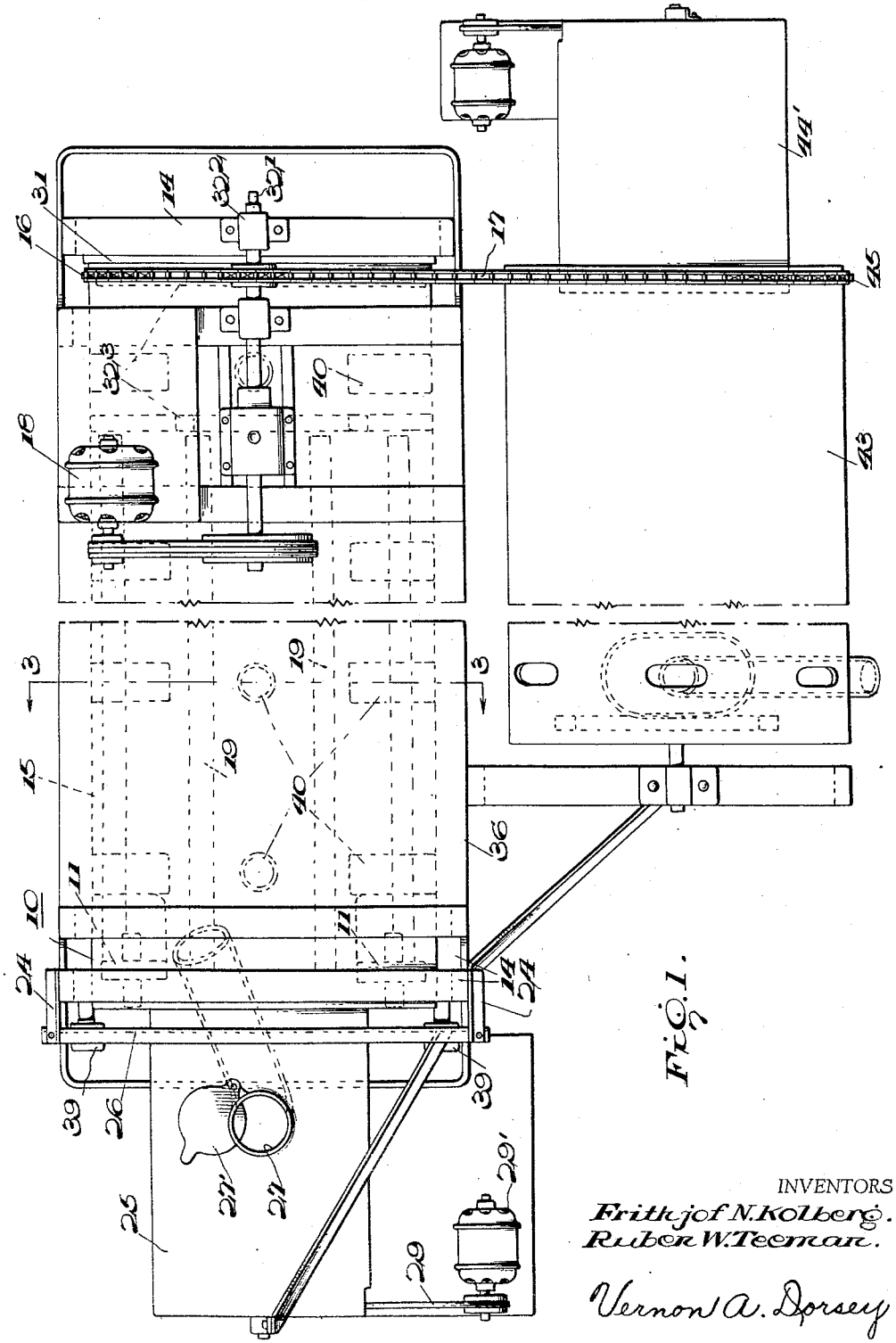

INVENTORS
Frithjof N. Kolberg
Ruben W. Teeman.

BY Vernon A. Dorsey
ATTORNEY

Jan. 9, 1951  R. W. TEEMAN ET AL  2,537,379
GRAIN DRYING AND COOLING APPARATUS
Filed April 5, 1946  4 Sheets-Sheet 4
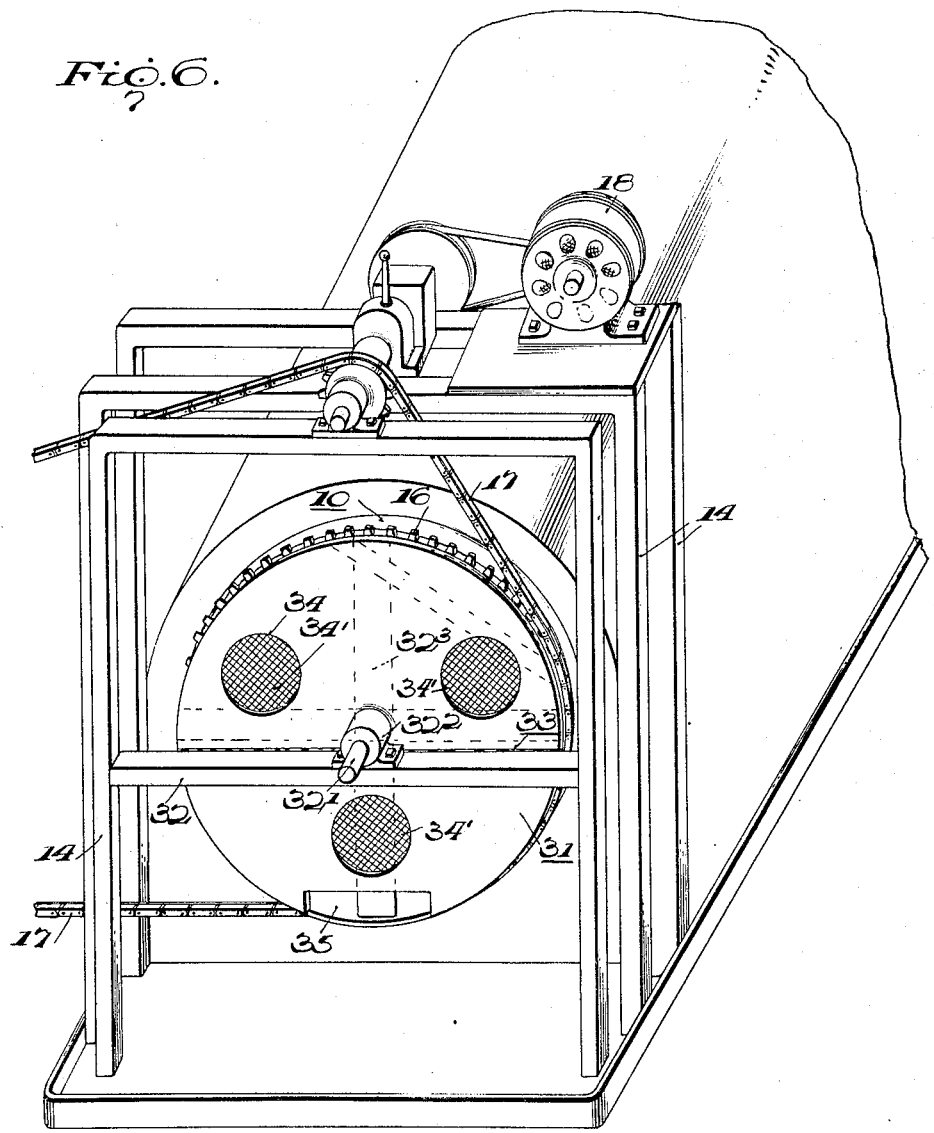
INVENTORS
Frithjof N. Kolberg
Ruben W. Teeman.
BY Vernon A. Dorsey.
ATTORNEY Patented Jan. 9, 1951

2,537,379

UNITED STATES PATENT OFFICE 2,537,379

GRAIN DRYING AND COOLING APPARATUS

Ruben W. Teeman and Frithjof N. Kolberg, Sioux Falls, S. Dak., assignors, by mesne assignments, to Kolman Manufacturing Company, a corporation of South Dakota Application April 5, 1946, Serial No. 659,966

4 Claims. (Cl. 34—133)

This invention relates to driers for material such as grain, and is particularly directed to a drier for corn, wherein drying is accomplished by means of a current of heated air brought into contact with a moving and agitated stream of corn to be dried.

It is the primary object of the invention to provide a novel arrangement of a drum and specialized air-supplying and directing means, wherein an intimate contact between air and grain is accomplished, thereby providing a drying action of unusual efficiency and economy, both in operating cost through savings in fuel and power, and in initial apparatus cost, both of these savings resulting from the reduction in required time of treatment of the grain.

In the accompanying drawings:

Figure 1 is a plan view of a drying plant arranged in accordance with the invention.

Figure 2 is an end elevation of the outlet end of the drier.

Figure 3 is a sectional view on line 3—3 of Fig. 1.

Figure 6 is a perspective view of the outlet end of the drier assembly.

Figure 4:
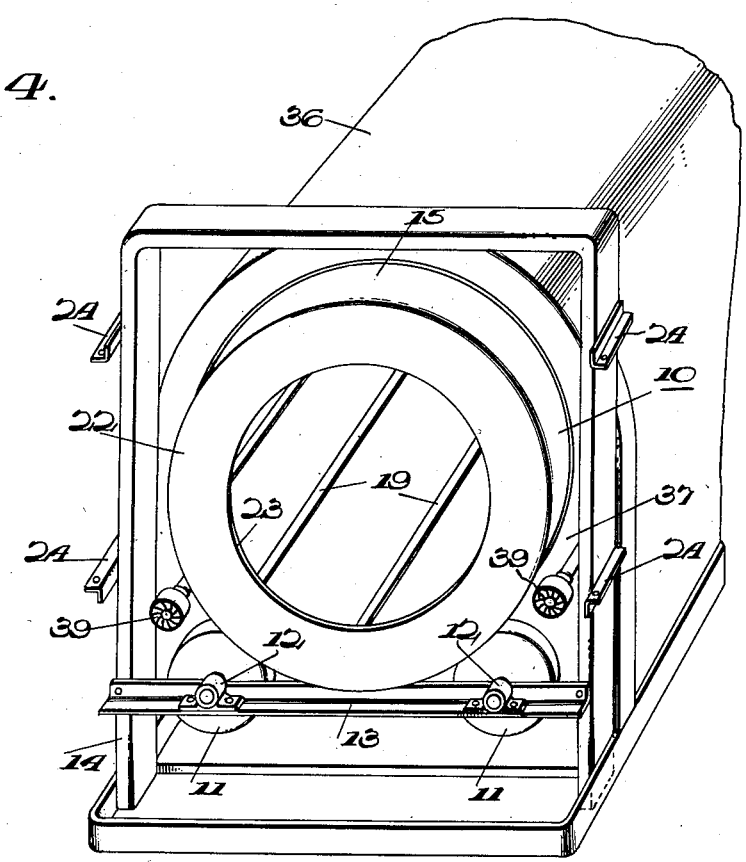
Figure 4 is a detail perspective view of the inlet end of the drum, with the feed and air-exhausting unit removed.

Describing the drawings in detail, the drying drum 10 is rotatable in a cradle structure comprising supporting rollers 11 journaled in bearings 12 carried by cross members 13 of a frame including vertical elements 14.

The drum comprises a cylindrical wall 15 that is supported in a position inclining downwardly from a feed end towards a discharge end. At a suitable point, as at the discharge end, the drum wall 15 is provided with external sprocket teeth 16, to provide rotation of the drum through a chain 17 by a power plant 18 mounted on the top elements of the frame. Internally the drum is provided with grain-elevating devices in the form of vanes 19 that extend radially inward from the inner surface of the wall 15, and which are provided at their inner margins with flanges 20 extending laterally from the vanes in the direction of rotation of the drum, forming pockets 21 for carrying grain upwardly from the bottom of the drum and releasing it as they pass through the upper reach of travel, to fall through the interior of the drum.

Figure 5:
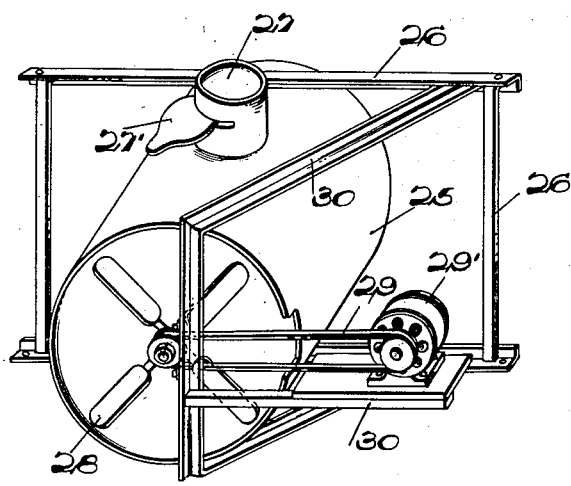
Figure 5 is a perspective view of the feed and air-exhaust unit that is attached to the inlet end of the drying drum.

The inlet end of the drum, shown in Fig. 4, is provided with an end wall 22 in the form of a flange extending inwardly from the wall 15 and provided with a central opening 23. A feed and air-exhausting unit, shown in Fig. 5, is mounted on brackets 24 attached to the vertical elements 14 of the framework for cooperation with the inlet end of the drum. This unit comprises a cylindrical casing 25 of suitable size to project into the drum through the opening 23, the casing being supported by a framework 26 that is secured to the brackets 24. A feed pipe 27, having a feed control valve 27', extends through the top of the casing 25 and beyond the end of the casing into the drum 10. Outwardly of the feed pipe 27, an exhaust fan 28 is disposed in the casing 25 for withdrawing air from the drum 10 through the opening 23 of the inlet end wall 22. The fan 28 is driven through a belt 29 from a motor 29' carried in a frame 30.

At the outlet end of the drum, shown in Figure 6, is a stationary closure plate 31, secured to a cross element 32 supported on the verticals 14, as by welding at 33. The lower end of the drum 10 is supported on the cross element 32 by a stub shaft 32¹ mounted in a bearing 32², cross supports 32³ mounted in the interior of the drum support the stub shaft 32¹ and therefore the lower end of the drum 10. Air inlet openings 34 are provided in the plate 31, these being in the nature of auxiliary inlets, as will later appear. These inlet openings are screened as at 34' to prevent escape of material being dried. An outlet opening 35 in the lower part of the plate 31 provides for escape of material after it has passed through the drying drum.

As indicated above, the air that is drawn into the drum through the openings 34 is an auxiliary supply. Such air, and air for another system of introduction is supplied by the heating and conducting system now to be described. This system comprises a housing in the form of an insulated wall 36 disposed about the drum 10. The upper reach of the housing wall 36 is arcuate and closely surrounds the upper reach of the drum wall, being spaced therefrom only sufficiently to provide clearance, while the lower part of the housing encloses between itself and the lower reach of the drum wall a passage 37 of substantial cross sectional area. This housing and the passage extend the full length of the drum, enclosure of which is completed at the outlet end by an end housing 38. The housing 36 surrounding the inlet end of the drum is open for free entry of air to the passage 37. In the latter at its inlet end air-heating burners 39 are arranged to heat the air as it enters.

Entry of heated air to the interior of the drum at suitably arranged locations spaced longitudinally and circumferentially of the drum wall, is accomplished by means of pipes 40, radially disposed and extending inwardly from the wall 15, to which their outer ends are secured, to points that will clear a body of grain supported on the bottom of the drum. To this end the inner ends of the pipes are spaced inward from the inner margins of the vanes 19. The pipes 40 enclose passages 41 that open inwardly into the interior of the drum and outwardly through the drum wall. The inner ends of the pipes are screened at 42 to prevent escape of grain.

As the fan 28 withdraws air from the drum, a stream of air is established in the drum which, due to the masking effect of the end plate 31 at the inlet end, tends to flow in the center region of the drum. Other air is drawn into the passage 37, being there heated by the burners 39 and flowing towards the outlet end of the drum. This heated air is drawn into the drum through the pipes 40, and because of the inward spacing of the inner ends of the pipes relative to the pocket structures 19, 20, is delivered into a region through which the grain is falling freely from the upper pockets to the bottom of the drum. In this way resistance to the entry of air to the drum is maintained at a minimum. Introduction of the air to a region in which the grain is in free falling condition also produces a maximum intimate contact between air and grain. The tendency of the air to flow through the middle region of the drum, due to the above-noted masking effect of the end plate, also contributes to the effects of low resistance to air flow and intimate contact, since in this middle region the grain is in the free falling condition described. The extension of the air inlet pipes 40 to points that will lie above the body of grain supported on the lower surface also contributes to free flow of air. Thus, it will be noted that in no part of the air stream thus established, is it necessary to force air through a body of grain supported on a surface. In addition to the foregoing purpose, the fan 28 is utilized to simultaneously withdraw dirt and chaff from the grain during drying of the latter.

By reason of the small clearance between the upper reaches of the drum and housing wall, see Figure 3, most of the air enters the drum through the pipes 40 as they travel across the lower reach of their path of travel. Therefore the greatest part of the air is introduced in streams flowing generally in countercurrent direction to the falling grain.

The various specialized arrangements described above cooperate to produce an exceptionally efficient drying action, so that the drum may be relatively short as compared to drums of prior rotary drum driers employing countercurrent heated air streams. An additional economy is effected in fuel by conducting the heated air through the passage 37 in contact with the drum wall, whereby the latter is heated and assists in the drying. Thus, it will be further noted, the grain is dried by both a direct and indirect application of heat thereto.

It is desirable to provide a device for cooling the grain after it is delivered from the outlet of the drum 10. To accomplish such cooling, a second rotary drum 43 is arranged alongside the drum 10 and the housing 36 that surrounds the same, being inclined in the opposite way to drum 10 for carrying the grain in the opposite direction. As seen in Figures 1 and 2, an air-exhaust and feed unit 44 is associated with the inlet end of the drum 43. Rotation may be imparted to the drum by the chain 17, extending around a sprocket structure 45 on the drum. An elevating conveyor 46 is arranged to receive grain from the outlet opening 35 of the drier drum 10 and deliver it to a feed chute 47 that extends through the casing of the unit 44 to the interior of the drum 43. The inlet end of the drum 43 is masked by an annular plate 48 closing the space between the drum wall and the casing wall of the unit 44. The interior of the drum 43 is provided with means for elevating and dropping the grain, similar to the vanes 19 of drum 15, so it will be cooled by contact with a stream of air flowing through the drum 43 toward the outlet end of the latter under the influence of the fan 41', and through which stream of cooling air the grain is dropped upon being carried to the top of the drum during rotation of the latter.

It is to be understood that the form of my invention herein shown and described, is to be taken as a preferred example of the same, and that various changes in the shape, size and arrangement of parts may be resorted to, without departing from the spirit of my invention, or the scope of the subjoined claims.

What is claimed is:

1. An apparatus of the character described including, an inclined rotary drum adapted to advance grain therealong having a grain inlet, a grain outlet and a plurality of screened spaced air inlets along its length, a casing disposed over and around the drum in spaced relation thereto except the bottom of the drum, a stationary member for partially masking the outlet end of the drum and having said grain outlet opening therein, means for preventing the ingress of air between the grain outlet end of the drum and the adjacent portion of the casing, heating elements disposed between the drum and casing, a combined air exhausting and grain feeding unit extending into the inlet end of the drum, and a motor-driven fan disposed within the said air exhausting and grain feeding unit for inducing a flow of air inwardly of the apparatus between the casing and the bottom of the drum from the grain inlet end of the drum, over the heating elements, through the spaced inlet openings in the drum and then outwardly through the drum in a direction toward and through the grain inlet end thereof, whereby to dry the grain moving through the drum toward the outlet in the masking member and to remove any chaff through the inlet end of the drum.

2. An apparatus in accordance with claim 1, wherein radially disposed screened pipes extend inwardly from the wall of the drum at each of the air openings therethrough so as to provide enclosed passages extending inwardly from the exterior of the drum wall.

3. An apparatus in accordance with claim 1, wherein there are a plurality of spaced longitudinally extending vanes carried by the internal wall of the drum for elevating the grain and dropping the same through the heated air flowing upwardly into the drum through the screen pipes of the drum during rotation of the latter.

4. An apparatus in accordance with claim 1, wherein the masking member is provided with a plurality of spaced auxiliary air inlets.

RUBEN W. TEEMAN.
FRITHJOF N. KOLBERG.

REFERENCES CITED

The following references are of record in the file of this patent:

UNITED STATES PATENTS

| Number | Name | Date |
| --- | --- | --- |
| 245,980 | Smith | Aug. 23, 1881 |
| 333,825 | Cadwell | Jan. 5, 1886 |
| 545,121 | Cummer | Aug. 27, 1895 |
| 629,644 | Axtell | July 25, 1899 |
| 726,805 | Verrell | Apr. 28, 1903 |
| 1,255,843 | Adt | Feb. 12, 1918 |
| 2,305,938 | Turnbull | Dec. 22, 1942 |